United States Patent
Kotikovsky (10) Patent No.: US 7,950,688 B2
(45) Date of Patent: May 31, 2011

(54) AIRBAG MODULE

(75) Inventor: Alexander P. Kotikovsky, West Bloomfield, MI (US)

(73) Assignee: TK Holdings Inc., Auburn Hills, MI (US)

( * ) Notice: Subject to any disclaimer, the term of this patent is extended or adjusted under 35 U.S.C. 154(b) by 108 days.

(21) Appl. No.: 12/385,149

(22) Filed: Mar. 31, 2009

(65) Prior Publication Data

US 2010/0066064 A1    Mar. 18, 2010

Related U.S. Application Data

(60) Provisional application No. 61/097,785, filed on Sep. 17, 2008, provisional application No. 61/118,120, filed on Nov. 26, 2008.

(51) Int. Cl.
*B60R 21/045* (2006.01)
*B60R 21/205* (2011.01)

(52) U.S. Cl. .................. 280/728.2; 280/730.1; 280/732; 280/753

(58) Field of Classification Search ............ 180/90; 280/728.2, 728.3, 730.1, 732, 752, 753; 296/37.1, 296/70
See application file for complete search history.

(56) References Cited

U.S. PATENT DOCUMENTS

| | | |
|---|---|---|
| 4,360,223 A | 11/1982 | Kirchoff |
| 4,721,329 A | 1/1988 | Brantman et al. |
| 4,942,626 A | 7/1990 | Stern et al. |
| 5,033,457 A | 7/1991 | Bonutti |
| 5,187,815 A | 2/1993 | Stern et al. |
| 5,197,775 A | 3/1993 | Reeber |
| 5,249,826 A | 10/1993 | Bell |
| 5,275,456 A | 1/1994 | Ishii et al. |
| 5,301,966 A | 4/1994 | Sakata |
| 5,308,109 A | 5/1994 | Igawa |
| 5,308,110 A | 5/1994 | Kokeguchi |
| 5,358,272 A | 10/1994 | Kokeguchi |
| 5,454,589 A | 10/1995 | Bosio et al. |
| 5,536,043 A | 7/1996 | Lang et al. |

(Continued)

FOREIGN PATENT DOCUMENTS

JP    10-071911 A    3/1998

(Continued)

OTHER PUBLICATIONS

International Search Report dated May 3, 2010 corresponding with International Application No. PCT/US2009/057147.

*Primary Examiner* — Eric Culbreth
*Assistant Examiner* — Joseph Rocca
(74) *Attorney, Agent, or Firm* — Foley & Lardner LLP (57) ABSTRACT

An airbag module for a vehicle includes a first storage compartment for use by an occupant of the vehicle and a second storage compartment for storing a first folded airbag prior to deployment. A single integrated cover overlies the storage compartments. The cover is configured to be integrated and installed into an instrument panel of the vehicle when the airbag module is installed in the vehicle. The cover includes a manually operable first door covering a first opening to the first storage compartment, and wherein, in an open position, the first door permits access to the first storage compartment. The cover includes a second door configured to open when the first airbag thereby creating a second opening in the cover to permit the first airbag to deploy into the vehicle.

14 Claims, 7 Drawing Sheets

U.S. PATENT DOCUMENTS

| | | | |
|---|---|---|---|
| 5,695,242 A | 12/1997 | Brantman et al. | |
| 5,746,446 A | 5/1998 | Breed et al. | |
| 5,775,729 A | 7/1998 | Schneider et al. | |
| 5,876,061 A | 3/1999 | Stavermann | |
| 6,010,147 A | 1/2000 | Brown | |
| 6,016,570 A | 1/2000 | Vande Pol et al. | |
| 6,019,390 A | 2/2000 | Keshavaraj | |
| 6,135,495 A | 10/2000 | Redgrave et al. | |
| 6,149,194 A | 11/2000 | Breed et al. | |
| 6,158,812 A | 12/2000 | Bonke | |
| 6,164,711 A | 12/2000 | Neal et al. | |
| 6,186,542 B1 | 2/2001 | Enders et al. | |
| 6,250,668 B1 | 6/2001 | Breed et al. | |
| 6,276,713 B1 | 8/2001 | Duletzke | |
| 6,296,277 B1 | 10/2001 | Bittinger et al. | |
| 6,302,437 B1 | 10/2001 | Marriott et al. | |
| 6,345,838 B1 | 2/2002 | Schneider | |
| 6,431,583 B1 | 8/2002 | Schneider | |
| 6,471,242 B2 | 10/2002 | Schneider | |
| 6,536,802 B1 * | 3/2003 | Sutherland et al. | 280/752 |
| 6,595,546 B2 | 7/2003 | Smith | |
| 6,601,902 B1 | 8/2003 | Rahmstorf et al. | |
| 6,629,911 B2 | 10/2003 | Cook | |
| 6,672,618 B2 | 1/2004 | Keshavaraj | |
| 6,688,643 B2 | 2/2004 | Schneider | |
| 6,712,385 B2 | 3/2004 | Enders | |
| 6,734,253 B2 | 5/2004 | Krabbenborg et al. | |
| 6,784,252 B2 | 8/2004 | Ramanathan et al. | |
| 6,793,238 B2 | 9/2004 | Schneider et al. | |
| 6,837,517 B2 | 1/2005 | Keshavaraj | |
| 6,848,705 B2 | 2/2005 | Schneider et al. | |
| 6,874,208 B2 | 4/2005 | Wong et al. | |
| 6,874,811 B2 | 4/2005 | Enders et al. | |
| 6,896,224 B1 | 5/2005 | Goodwin | |
| 6,932,380 B2 | 8/2005 | Choi et al. | |
| 6,971,667 B2 | 12/2005 | Enders et al. | |
| 6,991,252 B2 | 1/2006 | Enders | |
| 7,040,653 B1 | 5/2006 | Breed | |
| 7,048,304 B1 | 5/2006 | Keshavaraj | |
| 7,114,969 B2 | 10/2006 | Yamada | |
| 7,125,045 B2 | 10/2006 | Fuks et al. | |
| 7,147,246 B2 | 12/2006 | Breed et al. | |
| 7,175,195 B2 * | 2/2007 | Morita | 280/730.1 |
| 7,195,273 B2 | 3/2007 | Lewis et al. | |
| 7,195,279 B2 | 3/2007 | Rose et al. | |
| 7,235,606 B2 | 6/2007 | Spencer et al. | |
| 7,243,945 B2 | 7/2007 | Breed et al. | |
| 7,261,318 B2 | 8/2007 | Enders | |
| 7,328,913 B2 | 2/2008 | Song et al. | |
| 7,338,069 B2 | 3/2008 | Breed | |
| 7,347,444 B2 | 3/2008 | Wheelwright | |
| 7,364,189 B2 | 4/2008 | Morris et al. | |
| 7,370,884 B2 | 5/2008 | Clark et al. | |
| 7,393,011 B2 | 7/2008 | Keshavaraj | |
| 7,401,807 B2 | 7/2008 | Breed et al. | |
| 7,407,029 B2 | 8/2008 | Breed et al. | |
| 7,481,453 B2 | 1/2009 | Breed | |
| 7,484,792 B2 | 2/2009 | Penner | |
| 7,513,528 B2 | 4/2009 | Penner | |
| 7,523,803 B2 | 4/2009 | Breed | |
| 7,527,288 B2 | 5/2009 | Breed | |
| 7,575,248 B2 | 8/2009 | Breed | |
| 7,580,782 B2 | 8/2009 | Breed et al. | |
| 2002/0003343 A1 * | 1/2002 | Kansteiner | 280/728.3 |
| 2002/0180188 A1 * | 12/2002 | Abe et al. | 280/730.1 |
| 2003/0132621 A1 * | 7/2003 | Arieth et al. | 280/732 |
| 2004/0124617 A1 | 7/2004 | Morita | |
| 2005/0116449 A1 * | 6/2005 | Enders | 280/730.1 |
| 2006/0284400 A1 | 12/2006 | Sakakibara et al. | |

FOREIGN PATENT DOCUMENTS

| | | |
|---|---|---|
| JP | 2006-312398 | 11/2006 |
| JP | 2007-045241 | 2/2007 |

* cited by examiner

AIRBAG MODULE

CROSS-REFERENCE TO RELATED PATENT APPLICATIONS

This application claims priority from Provisional U.S. Application 61/097,785, filed Sep. 17, 2008, and Provisional U.S. Application 61/118,120, filed Nov. 26, 2008. The foregoing provisional applications are incorporated herein by reference in their entirety.

BACKGROUND

The present disclosure relates generally to the field of vehicle airbags which provide occupant protection when deployed (e.g., during a dynamic vehicle impact). Specifically, the disclosure relates to an airbag module which incorporates a first storage compartment for the use of the vehicle occupant, a second storage compartment for storing an airbag to protect the head or torso, and a cover overlying all of the storage compartments to form one integrated airbag module. More specifically, this disclosure relates to an airbag to protect the head and torso, an airbag to protect the knees, and a glove box integrated into one unit that the vehicle manufacturer would install into a motor vehicle.

Airbags are located in vehicles to protect occupants from injury during a vehicle dynamic impact event, which triggers sensors located in the vehicle to initiate deployment of an airbag(s). An airbag may deploy and inflate, by gas rapidly entering its cushion(s), typically through the use of an inflator containing an explosive charge (e.g., pyrotechnic device). Passenger torso and knee airbags are typically stored within and deployed from the passenger dashboard compartment. Passenger torso and knee airbags are typically packaged through a process of folding and rolling to compact the airbag in order to minimize its required packaging space. During a vehicle dynamic impact event, a passenger torso airbag deploys, typically from the upper portion (i.e., above the glove box) of the dashboard, in substantially rearward and upward directions to protect the torso and head of the occupant, while the knee airbag deploys, typically from the lower portion (i.e., below the glove box) of the dashboard, in substantially rearward and downward directions to protect the knees and legs of the occupant. The terms dashboard, dashboard assembly and instrument panel refer to the same component and are used interchangeably throughout this application.

It has been known to construct a vehicle to include a passenger torso airbag, a glove box assembly, and a passenger knee airbag, such that the three are assembled and shipped as independent assemblies and installed independently into a vehicle. It has also been known to construct a glove box to include a knee protection device, typically by coupling a trim plate to the leading edge of a deploying airbag.

It would be advantageous for a vehicle manufacturer to receive and install one assembly which integrates a glove box with protection devices to protect both the knees and torso of the occupant. This integration of assemblies reduces assembly labor, time, and costs for the customer by reducing the quantity of components and operations required to install the integrated assembly into the vehicle. Additionally, this integration reduces the number of components within the integrated assembly, which in turn reduces the packaging space required, reduces the mass of the system and vehicle, and reduces cost. The reduction of mass has always been a driving force behind vehicle manufacturers, but it has become even more important as the need for fuel efficiency continues to increase.

SUMMARY

According to a disclosed embodiment, an airbag module for a vehicle includes a first storage compartment for use by an occupant of the vehicle and a second storage compartment for storing a first folded airbag prior to deployment. A single integrated cover overlies the storage compartments. The cover is configured to be integrated and installed into an instrument panel of the vehicle when the airbag module is installed in the vehicle. The cover includes a manually operable first door covering a first opening to the first storage compartment, and wherein, in an open position, the first door permits access to the first storage compartment. The cover includes a second door configured to open when the first airbag deploys thereby creating a second opening in the cover to permit the first airbag to deploy into the vehicle.

According to another disclosed embodiment, a motor vehicle includes a passenger seat for containing a vehicle occupant and an instrument panel. An airbag module is installed in the instrument panel. The airbag module includes a first storage compartment for use by the vehicle occupant, and a second storage compartment for storing a first folded airbag prior to deployment. A single integrated cover overlies the storage compartments. The cover is configured to be integrated and installed into the instrument panel of the vehicle when the airbag module is installed in the vehicle. The cover includes a manually operable first door covering a first opening to the first storage compartment, and wherein, in an open position, the first door permits access to the first storage compartment. The cover includes a second door configured to open when the first airbag deploys thereby creating a second opening in the cover to permit the first airbag to deploy into the vehicle.

According to another disclosed embodiment, an integrated glove box and airbag module for a vehicle includes a glove box configured to be installed in an instrument panel of a vehicle, first and second airbag compartments, and first and second inflators. The glove box includes a storage compartment and a door, wherein the glove box is configured so that an occupant of the vehicle may open the door to the glove box in order to access the storage compartment. The first airbag compartment contains a first airbag, and the second airbag compartment contains a second airbag. The first and second inflators are configured to provide inflation gas for the first and second airbags, respectively. A single integrated cover overlies the glove box and first and second airbag compartments.

DETAILED DESCRIPTION

Generally referring to the FIGURES, an exemplary embodiment of vehicle 10 includes a dashboard assembly 20, a passenger seat 22, a cross-car beam 24, and a windshield 28. An exemplary embodiment of the dashboard assembly 20 includes a dashboard 25 and an airbag module 30. An exemplary embodiment of the airbag module 30 includes an integrated glove box and occupant protection assembly including a torso airbag 32 in a first airbag storage compartment 31. The torso airbag 32 inflates to protect the head and torso of an occupant. The airbag module 30 also includes a knee airbag 34 in a second airbag storage compartment 33. The knee airbag inflates to protect the knees and legs of an occupant 26. The airbag module 30 also includes a glove box assembly 40 to provide storage utility to an end user. The glove box assembly includes a glove box storage compartment 42. Finally, the airbag module 30 includes a housing 50 having a cover 51. The housing 50 couples the components of the airbag module 30 together, provides structural rigidity to the airbag module 30, and provides a mechanism for attachment to the vehicle 10. The airbag module 30 has reduced mass and reduced package size by utilizing more efficient and common structural components, which may be assembled as one unit at the vehicle manufacturing location, thereby reducing manufacturing labor required to install into the vehicle 10. The airbag module includes the following three compartments: a first storage compartment for use by an occupant of the vehicle (e.g., the glove box storage compartment 42); a second storage compartment for storing an airbag (e.g., the first airbag storage compartment 31); and a third storage compartment for storing an airbag (e.g., the second airbag storage compartment 33).

According to another exemplary embodiment, the airbag module 30 includes at least one inflator 36 for inflating the airbags 32 and 34. According to another exemplary embodiment, the airbag module 30 includes two inflators 36a and 36b. The inflator 36a inflates a torso airbag 32 stored in the first airbag storage compartment 31. The inflator 36b inflates a knee airbag 34 stored in the second airbag storage compartment 33.

According to an exemplary embodiment, the glove box door 46 may include the knee airbag 34 to protect the knees and legs of an occupant and an inflator 36b for inflating the knee airbag 34.

Figure 1:
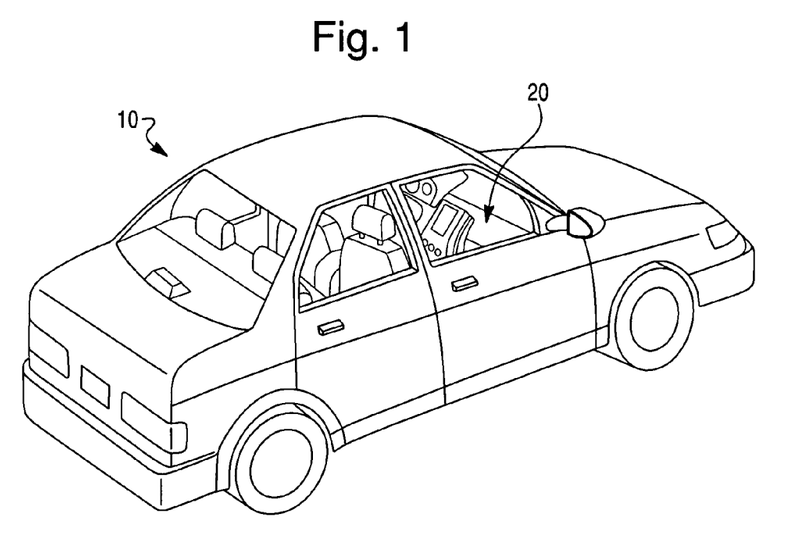
FIG. 1 is a perspective view of an exemplary embodiment of an automotive vehicle that includes an airbag module.

Referring to FIG. 1, an exemplary embodiment of the vehicle 10 is illustrated and includes the dashboard assembly 20. The vehicle 10 is illustrated as a typical sedan, but the airbag module 30 may be utilized in any type of passenger vehicle as well as other moving vehicles that offer seating capacity to passengers.

Figure 2:
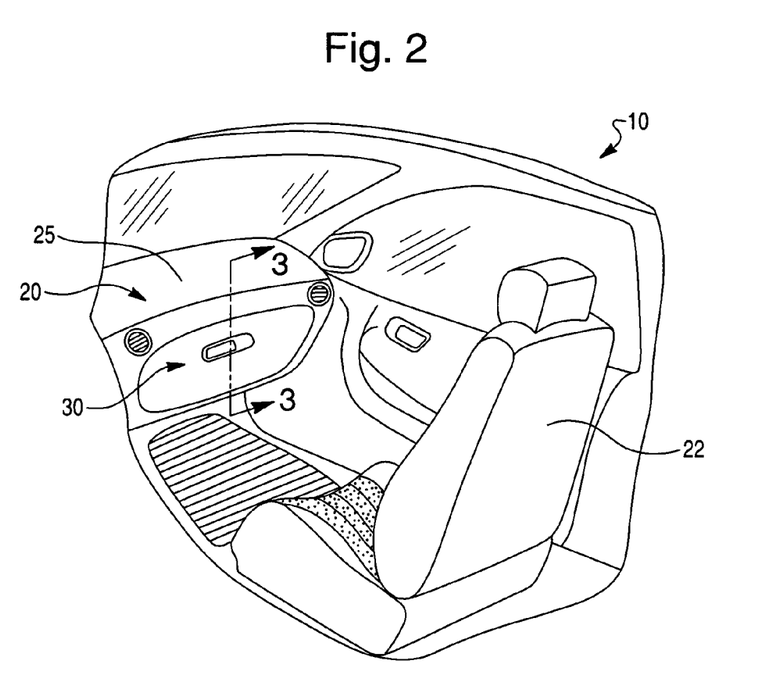
FIG. 2 is a perspective view of the interior passenger compartment of an exemplary automotive vehicle that includes an airbag module.

Referring to FIG. 2, the passenger compartment of the vehicle 10 is illustrated and includes the dashboard assembly 20 and the passenger seat 22. The dashboard assembly 20 includes the dashboard 25 and the airbag module 30, which is configured to fit within the unique packaging requirements of the vehicle 10. The airbag module 30 is flexibly configurable for use in varying package requirements, and may be tailored to satisfy specific needs of the vehicle manufacturer.

Figure 3A:
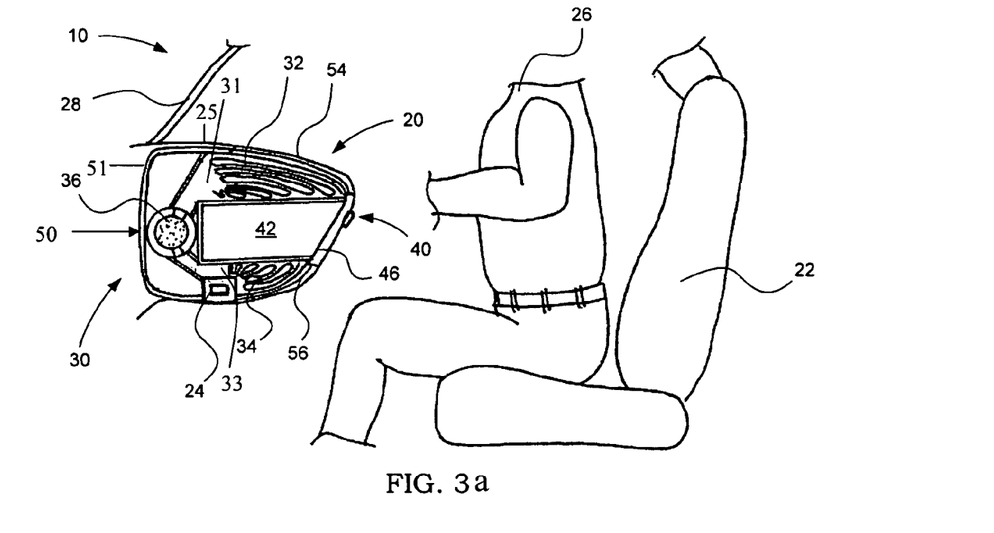
FIG. 3a is a cross-car section view of the interior passenger compartment of FIG. 2 according to an exemplary embodiment illustrating an airbag module in the folded (non-deployed) state.

Referring to FIG. 3a, a cross-section of the passenger compartment of the vehicle 10 of FIG. 2 is illustrated. The dashboard assembly 20, which is located below and rearward of the windshield 28, may include an integrated glove box and occupant protection assembly embodiment of the airbag module 30. The integrated glove box and occupant protection assembly includes a torso airbag 32, which may be folded and stored in a first airbag storage compartment 31 until deployment. The assembly also includes a knee airbag 34, which is folded and stored in a second airbag storage compartment 33 until deployment. At least one inflator 36 may be provided to inflate the airbags 32 and 34. The assembly also includes a glove box assembly 40, to provide storage utility to the user. The glove box assembly 40 includes a glove box storage compartment 42 and a glove box door or fascia 46. The glove box storage compartment 42 may be configured to meet customer needs for storage or be configured to include other useful features. The glove box door 46 may be configured to be pivotably coupled to the glove box assembly 40 through conventional means and may also include a release handle and locking mechanism, to provide traditional utility features. The integrated glove box and occupant protection assembly further includes a housing 50. The housing 50 includes a cover 51 which is configured to be integrated and installed into the dashboard assembly 20. The cover 51 includes a first airbag door 54 for providing access through an opening to the first airbag storage compartment 31. The cover 51 also includes the glove box door 46, and a second airbag door 56 for providing access through an opening to the second airbag storage compartment 33. The airbag doors 54 and 56 are configured to have conventional methods (e.g., hinge) to allow its respective airbag to breach the cover 51 during deployment. The airbag doors 54 and 56 may be configured to remain forward of the respective deploying airbag to allow proper deployment trajectory in order to maximize protection of the occupant 26. According to an exemplary embodiment, the integrated glove box and occupant protection assembly may be configured to couple through conventional means (e.g., fasteners) to the cross-car beam 24, which provides structural support to the integrated glove box and occupant protection assembly during deployment of the airbags.

Figure 3B:
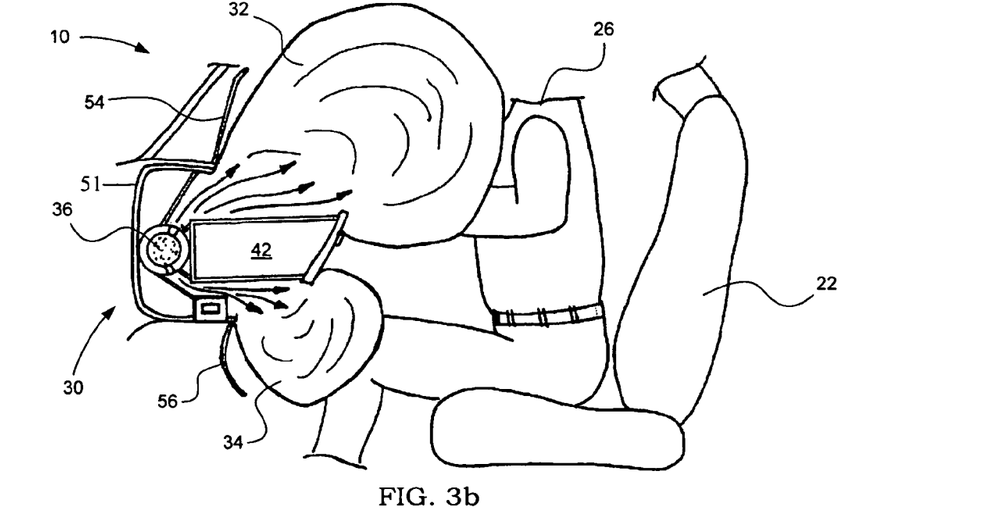
FIG. 3b is a cross-car section view of the interior passenger compartment of FIG. 2 according to an exemplary embodiment illustrating an airbag module in the unfolded (deployed) state.

Referring to FIG. 3b, a cross-section of the passenger compartment of vehicle 10 of FIG. 2 is illustrated. FIG. 3b is similar to FIG. 3a, except that the airbag module 30 shown in FIG. 3a is in a folded or non-deployed state, while the airbag module 30 shown in FIG. 3b is in an unfolded or deployed state. During a dynamic impact event of the vehicle 10, sensors provide relevant data to a controller that directs the initiation of the inflator 36 to generate gas, typically through an explosive charge (e.g., pyrotechnic device). The gas is emitted from the inflator 36 into the folded cushions of the torso airbag 32 and the folded knee airbag 34, causing the airbags to unfold and breach the airbag module 30 by forcing open the first and second airbag doors 54 and 56. The torso airbag 32 inflates to protect the head and torso of the occupant 26 from impacting the upper components of the vehicle 10 (e.g., dashboard 25, windshield 28). The knee airbag 34 inflates to protect the knees and legs of the occupant 26 from impacting the lower components of the vehicle and to prevent the occupant 26 from sliding under the dashboard assembly 20.

According to the exemplary embodiments in FIGS. 3a and 3b, the torso airbag 32 may be configured above the glove box storage compartment 42 and configured to deploy or inflate in a direction substantially rearward and upward to protect the head and torso of the occupant. In this arrangement, the first airbag storage compartment 31 shares a common wall with the glove box storage compartment 42. The knee airbag 34 may be configured below the glove box storage compartment 42 and configured to deploy or inflate in a direction substantially rearward and downward to protect the knees and legs of the occupant 26. In this arrangement, the second airbag storage compartment 33 shares a common wall with the glove box storage compartment 42.

Figure 4:
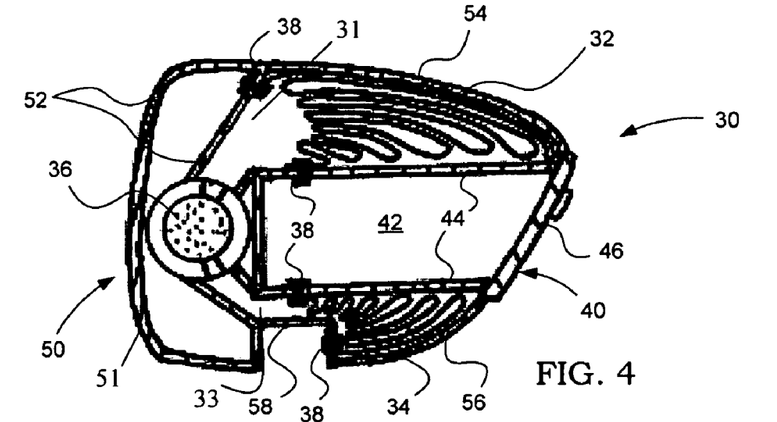
FIG. 4 is a cross-car section view of an exemplary embodiment of an airbag module illustrated in the folded (non-deployed) state.

Referring to FIG. 4, a cross-car (side) view of an exemplary embodiment of the airbag module 30 is illustrated in the folded (non-deployed) state, and includes the torso airbag 32 stored in the first airbag storage compartment 31. The airbag module 30 also includes the knee airbag 34 stored in the second airbag storage compartment 33; the inflator 36; a plurality of coupling members 38; the glove box assembly 40; and the housing 50. According to the exemplary embodiment, the glove box assembly 40 includes the glove box storage compartment 42, a glove box frame 44, and the glove box door 46. The glove box frame 44 is configured to comprise of a plurality of walls coupled together, which may enclose the glove box storage compartment 42, and may further comprise a mechanism for coupling an airbag through one of the coupling members 38. According to the exemplary embodiment, the housing 50 includes a plurality of fixed walls 52 (some of which comprise the cover 51), and a vehicle attachment mechanism 58. The fixed walls 52 may be configured to accommodate the packaging constraints of the vehicle 10, to offer structural support to withstand the forces generated during deployment of the torso airbag 32 and the knee airbag 34, and to provide structure for coupling the inflator 36 and for directing the gas generated by the inflator 36 into the airbags 32 and 34. The inflator 36 is configured to generate and force gas into both the torso airbag 32 and the knee airbag 34. This embodiment reduces the mass, the packaging size required, and the cost by integrating all components in an efficient manner. Other useful systems or features (e.g., fuses) may be incorporated into this embodiment.

Figure 5:
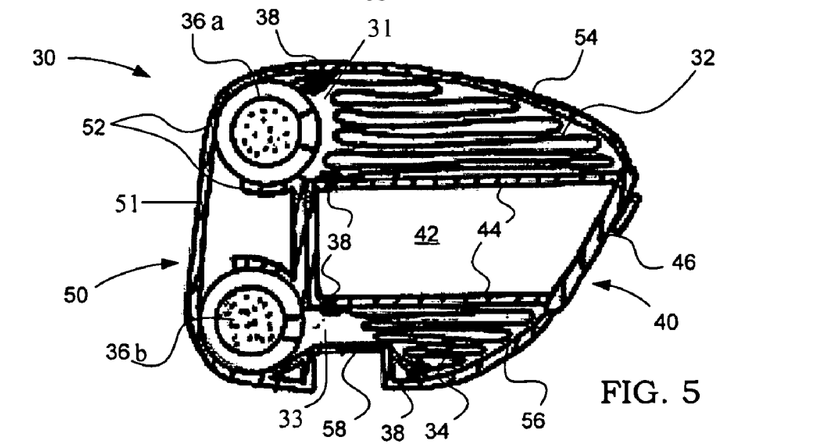
FIG. 5 is a cross-car section view of another exemplary embodiment of an airbag module illustrated in the folded (non-deployed) state.

Referring to FIG. 5, a cross-car (side) view of another exemplary embodiment of airbag module 30 is illustrated in the folded (non-deployed) state, and includes the torso airbag 32 in the first airbag storage compartment 31. The airbag module 30 also includes the knee airbag 34 in the second airbag storage compartment 33, inflators 36a and 36b, the plurality of coupling members 38, the glove box assembly 40, and the housing 50. The two inflators 36a and 36b may be configured such that inflator 36a generates and supplies gas to the torso airbag 32, while the inflator 36b generates and supplies gas to the knee airbag 34.

Figure 6:
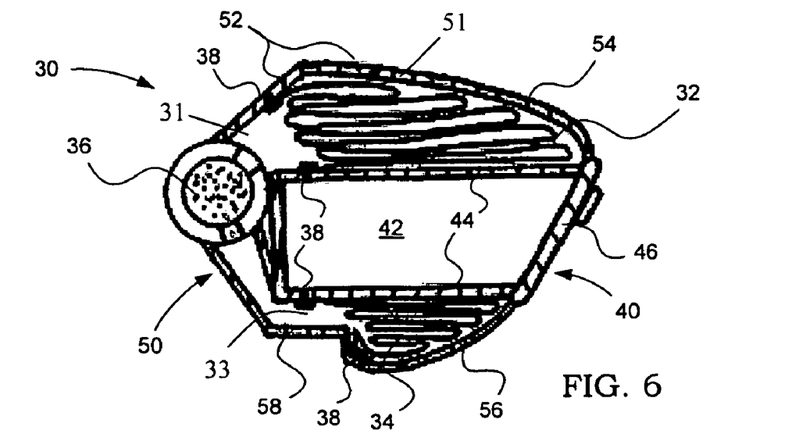
FIG. 6 is a cross-car section view of another exemplary embodiment of an airbag illustrated in the folded (non-deployed) state.

Referring to FIG. 6, a cross-car (side) view of another exemplary embodiment of airbag module 30 is illustrated in the folded (non-deployed) state, and includes the torso airbag 32 in the first airbag storage compartment 31. The airbag module 30 also includes the knee airbag 34 in the second airbag storage compartment 33, the inflator 36, the plurality of coupling members 38, the glove box assembly 40, and the housing 50. The cover 51 of housing 50 may be configured to minimize the packaging space required by reducing the number of the fixed walls 52 which comprise it. This exemplary embodiment optimizes the mass, the packaging size required, and the cost of the integrated assembly.

Figure 7:
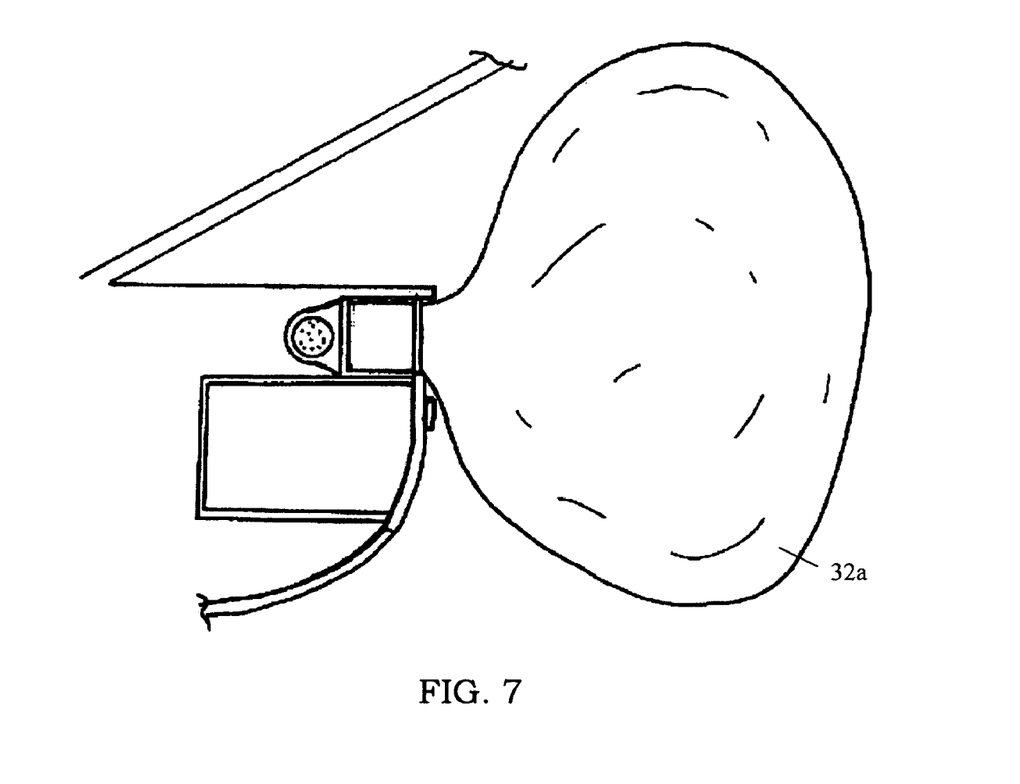
FIG. 7 is a cross-car section view of an example of a mid-mount passenger airbag that may be utilized in any of the embodiments of FIGS. 3a-6.
Figure 8:
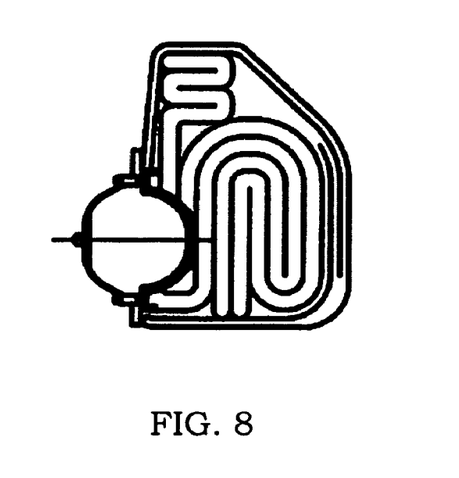
FIG. 8 is a cross-car section view of the example of a mid-mount passenger airbag of FIG. 7 illustrated in the folded state.

Referring to FIG. 7, a cross-car (side) view of an example of a mid-mount passenger torso airbag 32a is illustrated within the dashboard of a vehicle in the unfolded (deployed) state. One method of folding the mid-mount passenger airbag of FIG. 7 is shown in FIG. 8. The mid mount passenger airbag 32a is an example of the type of torso airbag 32 in FIGS. 3a-6 that may be integrated with a glove box and a passenger knee airbag into one airbag module 30. Other examples of mid-mount passenger torso airbags 32b may include different methods of folding to modify deployment of the torso airbag 32 to accommodate other design factors.

Figure 9:
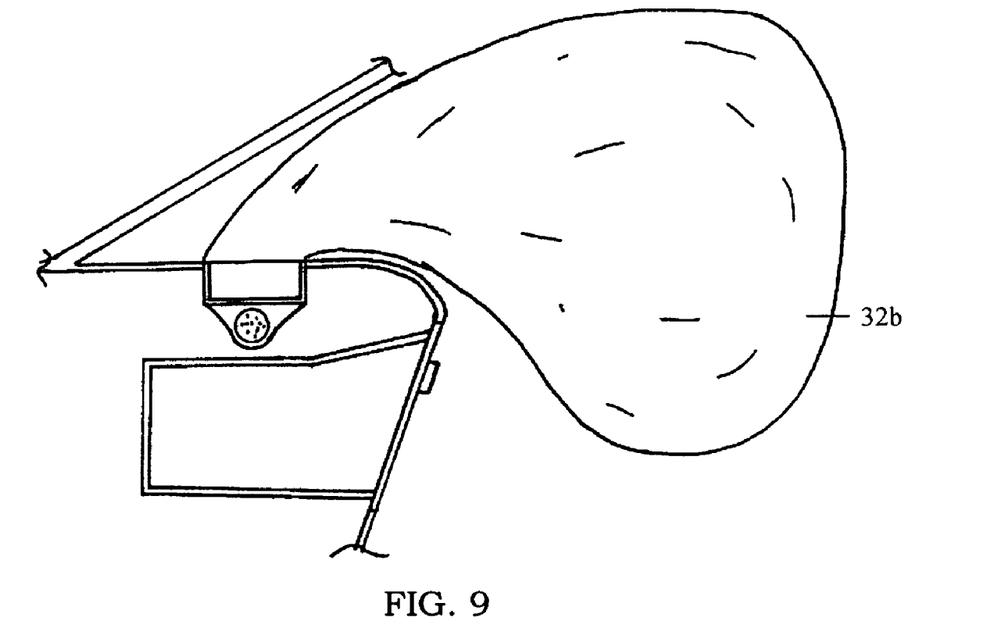
FIG. 9 is a cross-car section view of an example of a top-mount passenger airbag that may be utilized in any of the embodiments of FIGS. 3a-6.
Figure 10:
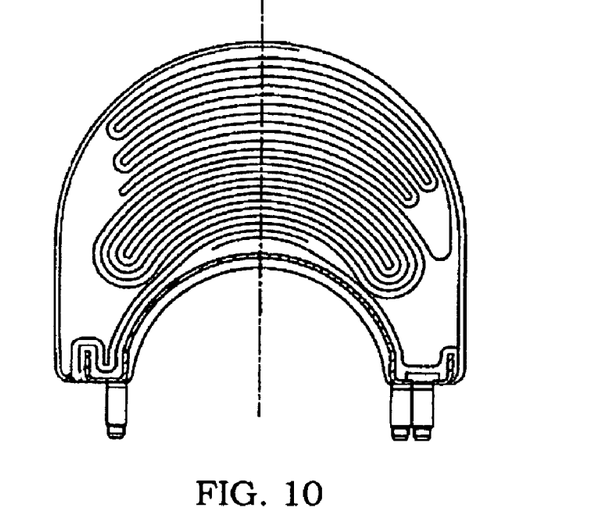
FIG. 10 is a cross-car section view of the example of a top-mount passenger airbag shown in FIG. 9.

Referring to FIG. 9, a cross-car (side) view of an example of a top-mount passenger torso airbag 32b is illustrated within the dashboard of a vehicle in the unfolded (deployed) state. One method of folding the top-mount passenger airbag of FIG. 9 is shown in FIG. 10. The top mount passenger airbag 32b is an example of the type of torso airbag 32 in FIGS. 3a-6 that may be integrated with a glove box and a passenger knee airbag into one airbag module 30. Other examples of mid-mount passenger torso airbags 32b may include different methods of folding to modify deployment of the torso airbag 32 to accommodate other design factors.

Figure 11:
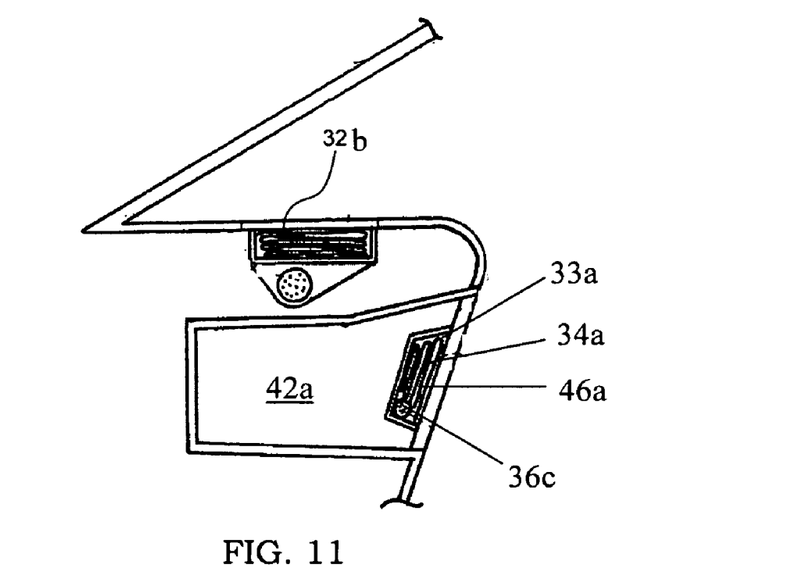
FIG. 11 is a cross-car section view of an example of a non-deployed top-mount passenger airbag and an example of a non-deployed knee airbag mounted in a glove box door that each may be utilized in any of the embodiments of FIGS. 3a-6.
Figure 12:
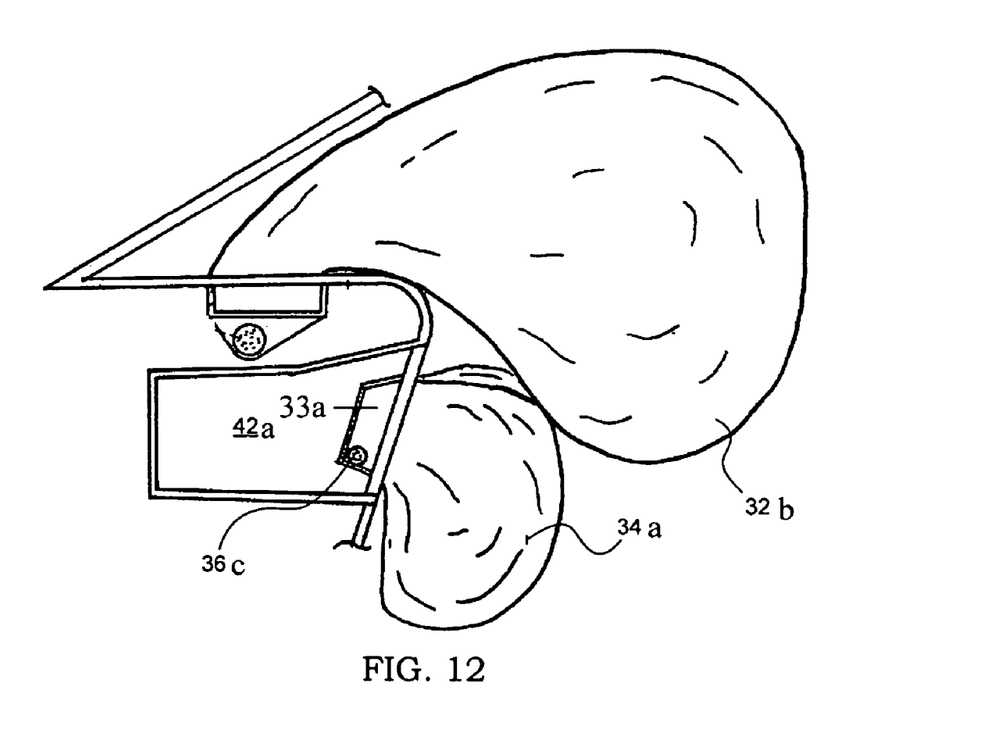
FIG. 12 is a cross-car section view of an example of a deployed top-mount passenger airbag and an example of a deployed knee airbag mounted in a glove box door that each may be utilized in any of the embodiments of FIGS. 3a-6.

Referring to FIG. 11, a cross-car (side) view of an example of a non-deployed top-mount passenger airbag 32b and an example of a non-deployed knee airbag 34a mounted in a glove box door 46a is shown. The second storage compartment 33 in FIGS. 3a-6 may be located similarly to a storage compartment 33a. The storage compartment 33a is attached to the glove box door 46a inside of a glove box storage compartment 42a. The knee airbag 34 may then be located similar to the knee airbag 34a. The knee airbag 34a is located in the storage compartment 33a. An inflator 36c is shown inside the storage compartment 33a but may be positioned outside of the glove box door 46a and may be positioned within or external to the glove box assembly 40a. The knee airbag 34a may be rolled, folded, or an combination thereof to improve deployment or to accommodate different packaging requirements of customers. Referring to FIG. 12, the top-mount passenger airbag 32b and the knee airbag 34a mounted in the glove box door 46a from FIG. 11 are shown deployed.

The exemplary airbag placements of FIGS. 11-12 provide efficient safety having reduced packaging space and reduced mass. Often the glove box door 46a is located within a vehicle such that its positioning is optimal for protecting the knees of the occupant, since glove box door 46a may be located proximate to and forward of the knees of the occupant. This forward and proximate position may be optimal because during a substantially frontal impact of a vehicle, the knees of the occupant will move forward from the forces generated by the decelerating mass of the occupant, and move towards the knee airbag 34*a*. This proximate position allows for a smaller airbag curtain, using less material, which costs less and requires a smaller package. Additionally, this position may eliminate the need for additional features (e.g., tethers) that modify airbag deployment to achieve optimal deployment when non-optimal positioning is required.

Figure 13:
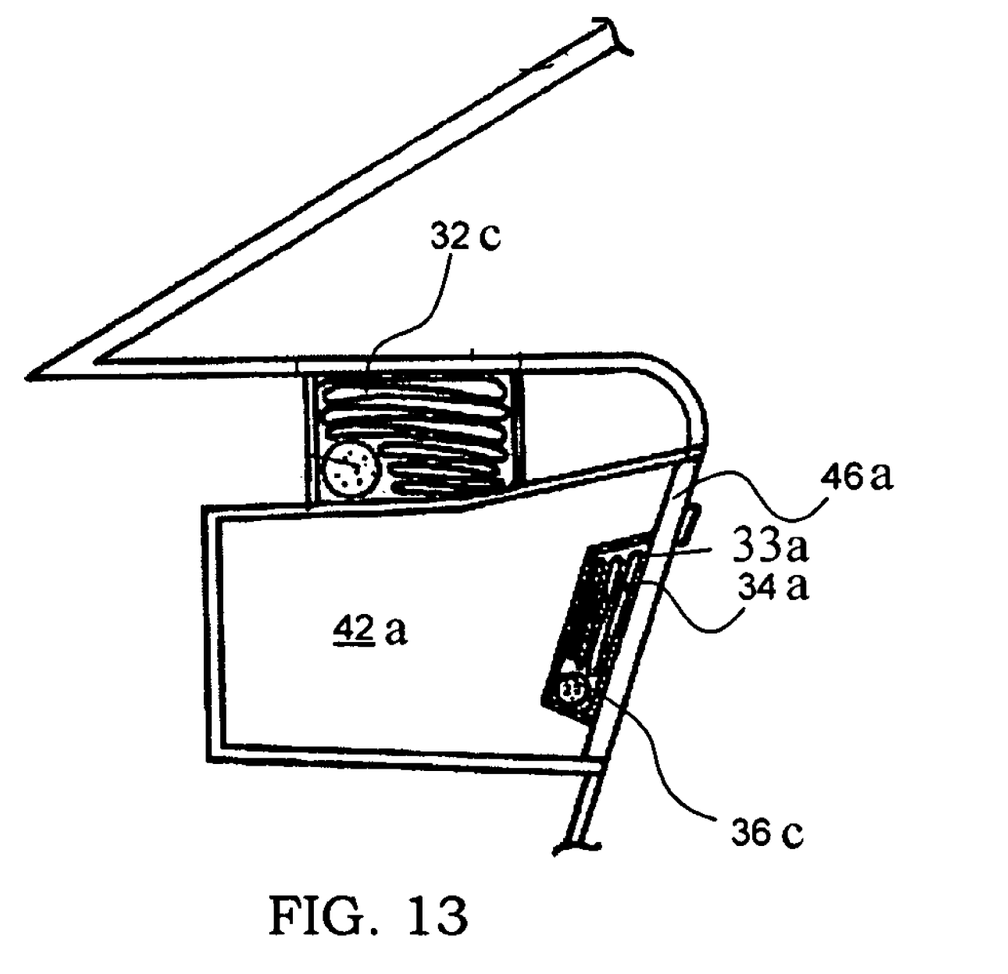
FIG. 13 is a cross-car section view of a second example of a non-deployed top-mount passenger airbag and an example of a non-deployed knee airbag mounted in a glove box door that each may be utilized in any of the embodiments of FIGS. 3a-6.

Referring to FIG. 13, a cross-car section view of a second example of a non-deployed top-mount passenger airbag 32*c* and the example of a non-deployed knee airbag 34*a* mounted in the glove box door 46*a* is shown. The top mount passenger airbag 32*c* is an example of the type of torso airbag 32 in FIGS. 3*a*-6 that may be integrated with a glove box and a passenger knee airbag into one airbag module 30.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "example" and "exemplary" as used herein to describe various embodiments is intended to indicate that such embodiments are possible representations and/or illustrations of possible embodiments (and such terms are not intended to connote that such embodiments are necessarily extraordinary or superlative representations).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for a vehicle, comprising:
   a first storage compartment for use by an occupant of the vehicle;
   a second storage compartment for storing a first folded airbag prior to deployment;
   a single integrated cover overlying the storage compartments;
   wherein the cover is configured to be integrated and installed into an instrument panel of the vehicle when the airbag module is installed in the vehicle;
   wherein the cover includes a manually operable first door covering a first opening to the first storage compartment, and wherein, in an open position, the first door permits access to the first storage compartment;
   wherein the cover includes a second door configured to open when the first airbag deploys thereby creating a second opening in the cover to permit the first airbag to deploy into the vehicle.

2. The airbag module of claim 1, wherein the first and second storage compartments share a common wall.

3. The airbag module of claim 2, further comprising an inflator for inflating the first airbag.

4. The airbag module of claim 1, further comprising a third storage compartment for storing a second folded airbag prior to deployment, wherein the cover includes a third door configured to open when the second airbag deploys thereby creating a third opening in the cover to permit the second airbag to deploy into the vehicle.

5. The airbag module of claim 4, wherein the first and second storage compartments share a common wall.

6. The airbag module of claim 5, wherein the first and third storage compartments share a common wall.

7. The airbag module of claim 6, further comprising an inflator for inflating the first and second airbags.

8. The airbag module of claim 6, further comprising a first inflator for inflating the first airbag, and a second inflator for inflating the second airbag.

9. The airbag module of claim 1, wherein the second storage compartment is above the first storage compartment.

10. The airbag module of claim 9, wherein the second storage compartment stores a mid-mount torso airbag or a top-mount torso airbag.

11. The airbag module of claim 1, further comprising a third storage compartment for storing a second folded airbag prior to deployment, wherein the third storage compartment is located within the first storage compartment, and wherein the cover includes a third door configured to open when the second airbag deploys thereby creating a third opening in the cover to permit the second airbag to deploy into the vehicle, and wherein the third door is located on the first door.

12. The integrated glove box and airbag module of claim 1, wherein first airbag compartment is located within the storage compartment of the glove box.

13. A motor vehicle, comprising:
   a passenger seat for containing vehicle occupant;
   an instrument panel; and an airbag module, the airbag module including:
- a first storage compartment for use by the vehicle occupant;
- a second storage compartment for storing a first folded airbag prior to deployment;
- a single integrated cover overlying the storage compartments;
- wherein the cover is configured to be integrated and installed into the instrument panel of the vehicle when the airbag module is installed in the vehicle;
- wherein the cover includes a manually operable first door covering a first opening to the first storage compartment, and wherein, in an open position, the first door permits access to the first storage compartment;
- wherein the cover includes a second door configured to open when the first airbag deploys thereby creating a second opening in the cover to permit the first airbag to deploy into the vehicle.

14. An integrated glove box and airbag module for a vehicle, comprising:
- a glove box configured to be installed in an instrument panel of a vehicle;
- wherein the glove box includes a storage compartment and a door, wherein the glove box is configured so that an occupant of the vehicle may open the door to the glove box in order to access the storage compartment; and
- first and second airbag compartments, wherein the first airbag compartment contains a first airbag and the second airbag compartment contains a second airbag; and
- first and second inflators, wherein each of the inflators is configured to provide inflation gas for the first and second airbags, respectively; and
- a single integrated cover overlying the glove box and first and second airbag compartments.

* * * * *